Oct. 23, 1945.  D. C. GERBER ET AL  2,387,655
SUCTION CLEANER
Filed Sept. 22, 1942  3 Sheets-Sheet 2

INVENTOR
Dale C. Gerber
Ralph C. Osborn
Harry S. Demarst
ATTORNEY

Patented Oct. 23, 1945

2,387,655

UNITED STATES PATENT OFFICE 2,387,655

SUCTION CLEANER

Dale C. Gerber, North Canton, and Ralph C. Osborn, Canal Fulton, Ohio, assignors to The Hoover Company, North Canton, Ohio, a corporation of Ohio Application September 22, 1942, Serial No. 459,238

10 Claims. (Cl. 183—57)

The present invention relates to suction cleaners in general and more particularly to a new and novel suction cleaner in which the air-filtering means are cleaned within the cleaner itself and without removal therefrom. More specifically the invention comprises a suction cleaner of the canister type in which dirt is initially removed from the cleaning air stream by means of a whirl separator and finally by a pervious filter, there being means by which the latter can be cleaned at the election of the operator in order to prevent the building of an undue back pressure in the cleaner, the foreign material removed from the final filter being removed by passing it again through the initial separator.

It is an object of the present invention to provide a new and improved suction cleaner. It is another object of the invention to provide a new and improved canister type suction cleaner in which the foreign material is removed from the cleaning air stream by means of an initial separator and a final separator, the latter comprising an air pervious filter and the cleaner including means by which the filter can be cleaned without disconnecting any parts of the machine. Still another object of the invention is to provide a new and improved suction cleaner incorporating an initial dirt separator and a final dirt separator, the latter comprising an air pervious filter element, in which the filter is cleaned while in situ within the cleaner and by means of reversing the flow of air therethrough, the reversal of the air flow being accomplished by new and novel means. A still further object of the invention is to provide a new and improved suction cleaner in which dirt is removed from the air stream by an initial separator and by a final air pervious dirt filter through which air passes in the order indicated, built-in means being incorporated to reverse the direction of air flow through the filter and to return it through the initial separator. These and other more specific objects will appear upon reading the following specification and claims and upon considering in connection therewith the attached drawings to which they relate.

Referring now to the drawings in which preferred embodiments of the present invention are disclosed, Figure 1 is a vertical section through a cleaner constructed in accordance with the present invention, the section being taken upon the line 1—1 of Figure 2;

Figure 1:
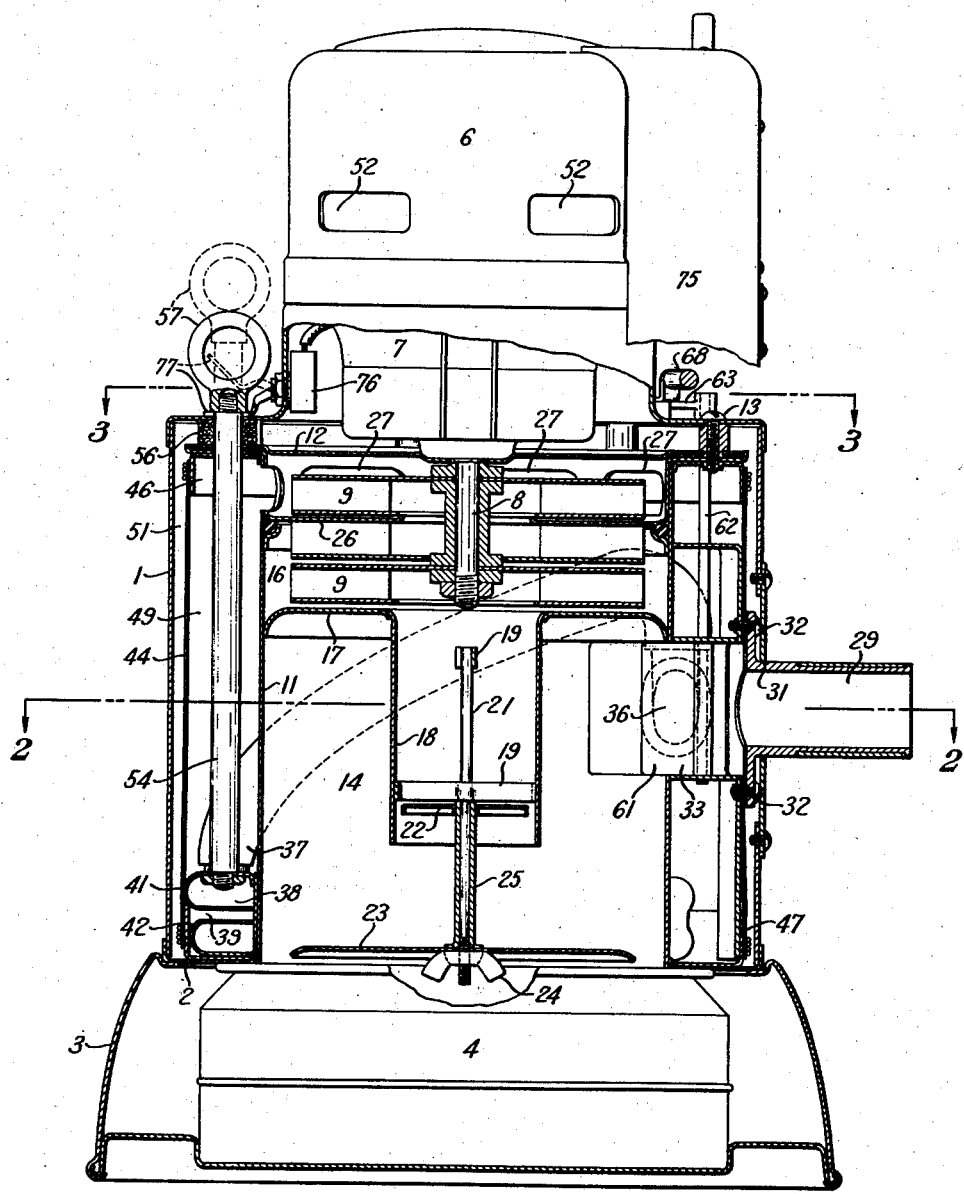

The present invention comprises an improvement upon the suction cleaner disclosed and claimed in the patent to W. E. Bible 2,247,472, granted July 1, 1941, on an application filed April 5, 1940. In the Bible construction the dirt-laden air stream passing through the cleaner first passes through an initial dirt separator comprising a whirl chamber, is then drawn through suction-creating fans and thereafter exhausted into the final separator comprising a fabric filter. To clean the latter it is necessary to remove the nozzle from the outer end of the dusting tool hose which connects at its inner end directly to the whirl chamber and then to attach the outer end to a slidable pipe which connects directly to the filter-cleaning nozzle manually movable adjacent the final filter. The cleaner suction is then effective to draw air in a reverse direction through the final fabric filter into this cleaning nozzle, the air passing through the aforementioned pipe, through the dusting tool hose and back into the filter chamber where practically all of the removed foreign material is separated from the air stream. In the present improved construction it is unnecessary to disconnect the cleaner nozzle from the dusting tool hose or to connect the dusting tool hose to the filter-cleaning nozzle. The entire conversion from an operating suction cleaner to a self-cleaning unit is accomplished by a simple operation requiring no disconnecting or connecting of parts as will hereinafter be fully set forth.

Referring again to the drawings and to Figures 1 to 3, inclusive, in particular, the first embodiment of the invention is illustrated.

The cleaner constructed in accordance with the present invention in its general outline closely resembles the cleaner disclosed in the Bible Patent 2,247,472. A central housing formed with an inwardly extending flange-like bottom plate 2 removably seats upon a base element 3 which houses an open top dirt-pan or container 4. The top of housing 1 is closed by the motor casing 6 which flares outwardly at its lower end and which houses a rotary driving motor 7 the shaft 8 of which extends downwardly into the housing 1 where it carries the rotors 9 of a two stage fan.

The interior of housing 1 is divided into functionally important divisions by a vertical cylindrical wall 11 which extends between the bottom plate 2 of the housing and a top closure wall 12 which extends outwardly therebeyond to be secured to the motor casing as by screws 13. The space within the cylindrical wall 11 is divided into a whirl chamber 14 and a fan chamber 16 by means of an inwardly extending horizontal wall 17 from the open center of which an intake sleeve 18 extends downwardly. The sleeve 18 forms the intake to the fan chamber from the whirl chamber 14 and extends a considerable distance down into the latter. Spaced radially extending arms 19 in the sleeve carry a vertical shaft 21 which supports a strainer element 22 near the lower end of the sleeve and a circular protecting plate 23 near the lower end of the whirl chamber immediately above the open topped dirt pan 4. Strainer 22 and plate 23 are spaced by a sleeve 25 enclosing shaft 21 and are held in place upon the supporting rod 21 by means of a manually removable thumb nut 24.

The fan chamber 16 is divided by a stationary deflector 26 provided with a plurality of air-directing guide vanes into a first stage and a second stage. The first stage opens into the whirl chamber 14 through the inlet sleeve 18, and the second stage is provided with a plurality of exhaust ports 27 in the cylindrical wall 11 in order that the fan can exhaust into the enclosing casing 1.

The intake for air entering the cleaner comprises a flanged inlet tube 29 which extends through an opening 31 in the housing 1 to be secured by screws 32 to a tangentially extending port 33 fixed rigidly to the wall 11 of the whirl chamber at a point immediately below the fan chamber 16 and, accordingly, near the top of the intake sleeve 18. A second intake port 36 is provided adjacent the primary intake port 33 and to port 36 there connects a flexible tubing 37 of a suitable material such as rubber or rubberized fabric. Tube 37 extends circumferentially around the periphery of the whirl chamber 14 in order to provide it sufficient length to be flexible and connects at its opposite end to a circular ring-like nozzle 38 provided with a peripheral intake slot 39 defined by spaced rounded lips 41 and 42. As is clearly illustrated in Figure 2 nozzle 38 extends substantially entirely around the whirl chamber except that part immediately below the intake ports 33 and 36, the nozzle having substantially the shape of a horseshoe.

Surrounding the fan chamber 16 and whirl chamber 14 and spaced slightly within the housing 1 is a cylindrical filter 44 which is secured at its upper edge to a depending circular flange 46, depending from the plate 12, and at its lower edge to an upwardly extending flange 47, carried by the bottom plate 2 of the housing 1. Cylindrical filter 44 forms a chamber 49 between itself and the cylindrical wall 11 which entirely encircles the whirl chamber 14 and the fan chamber 16 excepting only the intake port 33 at which point the filter is formed with an opening the edges of which are secured between the flanged conduit 29 and the walls of the port by means of the screws 32. The space exterior of the cylindrical filter 44 is indicated at 51 and opens into the interior of the motor casing 6 around the motor 7, the casing 6 being provided with suitable exhaust ports as indicated at 52.

The cylindrical filter 44 is positioned, it is to be noted, immediately adjacent the lips 41 and 42 of the nozzle 38, the upper lip 41 extending radially outward slightly beyond the lower lip 42. To actuate the nozzle there is provided a vertically extending shaft 54 which passes upwardly through the plate 12, a dust-sealing washer 56, and the flanged bottom of the motor casing 6 to be formed at its upper end with a ring 57 adapted to be grasped by the operator to exert a vertical force upon the nozzle 38 to raise and lower it within the filter chamber 49 and in contact with the filter 44.

The nozzle 38 has been described as connected by the flexible hose 37 to the port 36 which, like the primary port 33 opens into the whirl chamber 14. In order to control selectively the flow of air into ports 33 and 36 there is provided a pivoted valve 61 which is adapted to swing between two positions in one of which, as illustrated in full lines in Figure 2, it closes the port 36 and in the other of which, as illustrated in dotted lines in the same figure, it closes the port 33. Valve 61 is carried by a vertically extending shaft 62 and this shaft, as is clearly seen in Figure 1, extends upwardly through the plate 12 and the horizontally extending lower portion of the motor casing 6, to the top thereof where it carries a rocker arm 63. The angular rotation of shaft 62 under a force exerted upon the rocker arm 63 will effect a pivotal movement of the valve 61 and the means which effect the actuation of the rocker arm 63 will now be described.

An electrical solenoid 66 provides the valve-actuating power and comprises a winding 67 and a movable armature 68 formed with a longitudinally extending slot 69 and a transversely extending slot 71. Slot 69 slidingly seats upon a pin 72 carried by the motor casing to guide the armature 68 in and out of the solenoid winding 67. Within the slot 71 there extends a pin 73 which is carried by the aforementioned rocker arm 63 to cause the latter to pivot with the shaft 62 as the armature 68 moves in and out of the solenoid. A coil spring 74 at all times exerts a force upon the armature 68 to draw it to its outermost position in which the rocker arm 63 secures the vertical shaft 62 in the position in which valve 61 closes the port 36 leading to the filter-cleaning nozzle 38. Displacement of the valve from that position can be accomplished only by the energization of the solenoid 66. A supplementary housing 75 secured to the motor casing 6 protects the solenoid 66 and its connections with the rocker arm 63 of valve shaft 62.

To energize the solenoid there is provided an electrical switch 76 which includes a forked spring-biased operating lever 77 extending around the end of nozzle-actuating shaft 54 immediately below the ring 57. With the nozzle in its lowermost or inoperative position and the ring 57 seating against the motor casing 6 the actuating lever 77 of the switch is held down and the switch is opened. Upon the shaft 54 moving upwardly, however, the forked lever 77 pivots upwardly to the dotted line position as illustrated in Figure 1 resulting in the closure of the switch to effect the energization of the solenoid, the switch being in series with the solenoid and being connected in parallel with the motor 7 across the incoming power line as illustrated diagrammatically in Figure 3. In that figure the incoming power lines are indicated by the reference characters 81 and 82, the normal cleaner switch by the reference character 83, the motor by the reference character 7 and the leads which connect the switch 76 and the solenoid 66 to the incoming leads 81 and 82 and in parallel with motor 7 by the reference characters 84 and 86, and the lead between the switch and the solenoid by the reference character 87.

The operation of this preferred embodiment of the invention is as follows. Energization of the cleaner switch causes electric current to energize the motor effecting the rotation of the suction-creating fan 9. A reduced pressure is thereupon effected within the intake 18 of the fan chamber 16 and cleaning air is drawn into the whirl chamber 14 by the port 33, a suitable dusting tool hose being attached to the intake conduit 29. The air enters the whirl chamber tangentially and the foreign material separates from the moving air to be deposited within the dirt container 4 while the air is itself drawn upwardly through the intake sleeve 18 into the fan chamber. From the latter it is exhausted through the ports 27 into the final filter chamber 49 from which it passes through the cylindrical filter 44 into the exhaust chamber 51. From the latter it passes upwardly and through the motor to perform a cooling function.

Practically all of the foreign material carried by the air is removed in the whirl chamber 14, but a very small percentage of fine dust escapes and is exhausted into the chamber 49 where it collects upon the inner surface of the final filter 44 as the air passes outwardly through that member. After continued use and over an extended period of time the collected fine foreign material upon this filter 44 tends to increase the resistance to the flow of air through the cleaner. This is called an increase in cleaner back pressure and decreased cleaning efficiency is the result. It then becomes desirable to clean the final filter 44 and this operation is effected in a manner now described.

Figure 2:
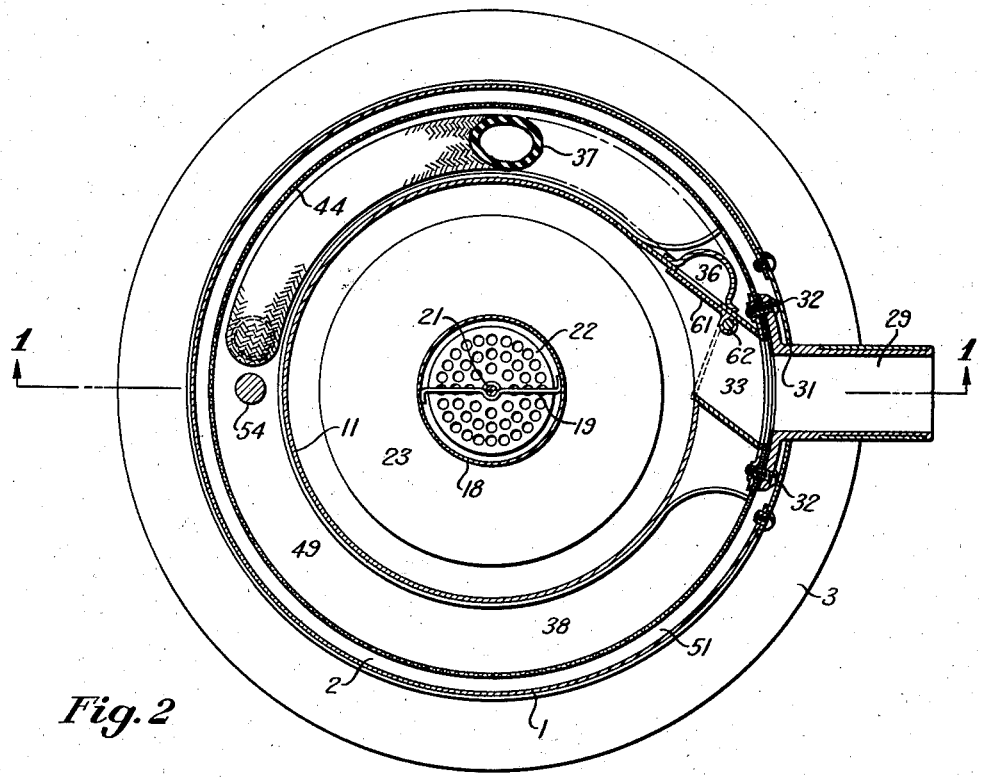
Figure 2 is a horizontal transverse section through the cleaner upon the line 2—2 of Figure 1 and illustrates the built-in valve mechanism which controls the air flow.
Figure 3:
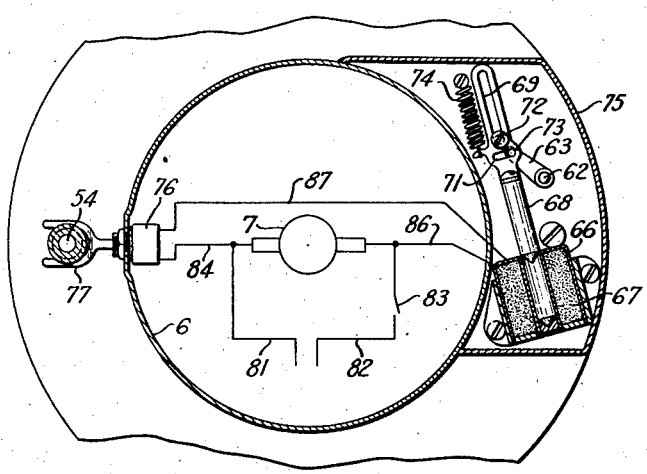
Figure 3 is a transverse section upon a horizontal plane on the line 3—3 of Figure 1 and discloses the electrical valve-actuating means.

The operator grasps the ring 57 exerting an upward force upon the nozzle 38 which is interiorly connected, as described, by the flexible tube 37 to the whirl chamber secondary intake port 36 which is normally closed by the valve 61. The initial upward movement of the ring 57 permits the spring biased actuating lever 77 of the switch 76 to move upwardly thereby closing the solenoid-energizing circuit to pass current through the winding 67. The energization of the solenoid causes the armature 68 thereof to be drawn downwardly, as illustrated in Figure 3, against the opposing force of the coil spring 74 and this movement of the armature effects the pivotal movement of the rocker arm 63 fixedly connected to the vertical shaft 62 carrying the port-closing valve 61. Valve 61 thereupon moves from its full line position to its dotted line position, as shown in Figure 2, and the port 36 is opened to the interior of the filter chamber while the port 33 is closed thereto.

The suction within nozzle 38 draws the filter 44 against the lips 41 and 42 and air is then drawn through the filter, through the nozzle 38 and hose 37, and into the whirl chamber in response to the suction created by the fan 9. The air from the filter chamber continues, as before, to be exhausted through the ports 27 of the fan chamber into the final filter chamber 49 and to pass outwardly through the final filter 44, excepting only that part of the final filter which is drawn to the lips 41 and 42 by the suction of nozzle 38. Between those lips at the slot 39 air is drawn through the filter 44 in a reverse direction resulting in the displacement of the collected foreign material. The operator to effect complete cleaning of the cylindrical filter 44 moves the nozzle 38 up and down the entire height of the filter chamber 49 in order to contact substantially the entire length of the fabric filter 44. Repetition of this cleaning operation several times effects the removal of the collected foreign material upon the inside of the filter and its passage back into the whirl chamber 14. It has been found that the collection of this foreign material upon the fabric filter 44 causes an agglomeration which, when the same material has been re-circulated through the whirl chamber, results in its removal from the carrying air stream.

When the nozzle 38 has been reciprocated a few times the operator returns the ring 57 to its initial position as illustrated in Figure 1. The solenoid-controlling switch 76 is thereupon opened and solenoid armature 68 returns to its original position as illustrated under the actuation of the coil spring 74. Nozzle port 36 is thereupon closed and the normal operating port 33 is opened again to the whirl chamber whereupon cleaning air is drawn through the intake conduit 29 and through any dusting tools which may be attached thereto. The cleaner is again then ready for normal cleaning operation.

Figure 4:
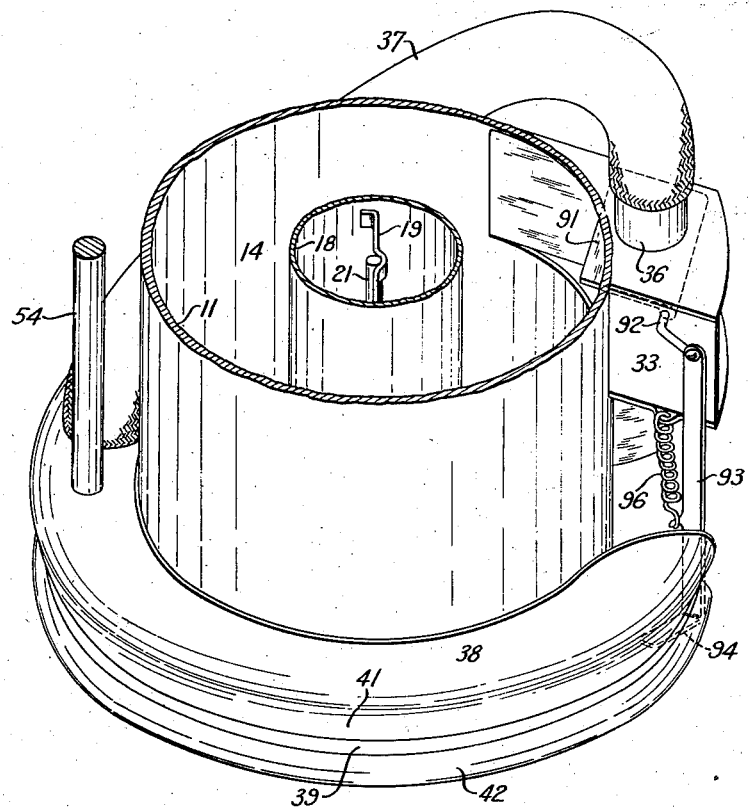
Figure 4 is a view in perspective of a manually operable valve-controlling mechanism constructed in accordance with the second preferred embodiment of the invention.
Figure 5:
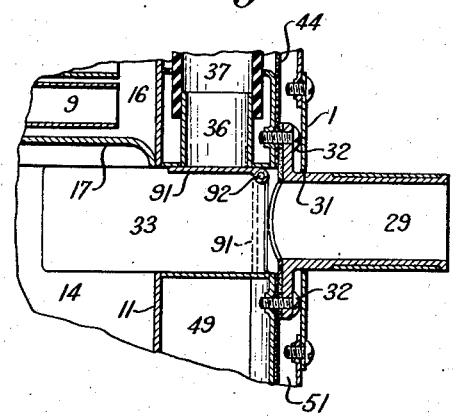
Figure 5 is a vertical section through the valve chamber of the second preferred embodiment of the invention illustrated in Figure 4.

Turning now to the second embodiment of the invention illustrated in Figures 4 and 5 in particular, the basic relationship of parts found in the first described embodiment is present but the electrical actuating means for the port-controlling valve has been eliminated and in its place has been provided a simple manually operable means which is controlled directly by the movement of the filter-cleaning nozzle 38. Only those features of this second embodiment of the invention which differ from the first will be described and in all other respects it is to be understood that the second embodiment is like the first.

Referring now to Figures 4 and 5 it is seen that the cylindrical wall 11 which forms the whirl chamber 14 is again provided with an intake port 33 but that the port 36 of the first embodiment which connected to the flexible conduit 37 has been moved from its position at the side of the port 33 to a position thereabove. The flow of air through the ports 33 and 36 are controlled by a valve 91 which is pivotally mounted upon a horizontally extending shaft 92 so as to be movable between two positions, as illustrated in Figure 5. In the full line position there illustrated it closes the port 36 while in the dotted line position it closes the port 33. Valve 91 is actuated through the provision of a vertically-extending arm 93 formed at its lower end with a foot 94 and pivoted at its upper end to the offset arm of shaft 92. The foot 94 underlies the adjacent end of filter-cleaning nozzle 38. A coil spring 96 connected between the bottom wall of port 33 and the arm 93 at all times exerts a lifting force upon the latter to pivot shaft 92 to move valve 91 into closing relationship with port 33 and into open position relative to port 36.

The operation of this second embodiment of the invention is believed to be clear from the description of the first embodiment and the close relationship existing between the two embodiments. The operation of the two embodiments in their normal cleaning operations is identical. The difference is present only in the internal operation during filter-cleaning operation. In the latter operation in this second embodiment the raising of the nozzle 28 to perform its cleaning operation permits the arm 83 to be raised vertically under the actuation of the coil spring 96. Thereupon the valve-carrying shaft 92 rotates and valve 91 moves to open the port 36 and to close the port 33. Cleaning air is then drawn into the filter-cleaning nozzle 38 which performs its cleaning function relative to the enclosing and surrounding cylindrical filter 44 as in the first embodiment. As in the first embodiment the return of the cleaning nozzle to its initial position upon the conclusion of the filter-cleaning operation effects the reversal of the position of the port-controlling valve and the machine is again ready for normal cleaning operation.

We claim:

1. A vacuum cleaner having an inlet port for dirt-laden air, a preliminary dirt separator, suction-creating means connected to said preliminary separator to draw air therethrough, a final dirt separator connected to said suction-creating means to receive air exhausted therefrom, dirt-collecting means to collect foreign material in said final separator, air-conducting means to connect said dirt-collecting means to said preliminary dirt separator, and valve means to control selectively the flow of air through said inlet port and through said air-conducting means.

2. A vacuum cleaner having a preliminary dirt separator adapted to remove substantially all foreign material from air passing therethrough, suction-creating means connected at its suction side to said preliminary separator to draw air therethrough, a final dirt separator connected to said suction-creating means to receive air exhausted therefrom and including a dirt-collecting element permeable to air and impermeable to dirt and on which dirt collects, a dirt-collecting nozzle movable within said final filter and over said dirt-collecting element, manually operable means to actuate said nozzle, and means including a valve connected to and controlled by said manually operable means to connect said nozzle to said preliminary separator to enable the air drawn by said suction-creating means to remove the dirt collected by said nozzle directly into said preliminary separator.

3. In a vacuum cleaner, a whirl chamber for preliminary air cleaning having an inlet port, a final air-filtering chamber having an air-permeable wall, suction-creating means for moving air through said chambers, a cleaning nozzle for said air-permeable wall movable relative thereto, air-conducting means of a capacity to conduct substantially the normal volume of cleaning air moved by said suction-creating means connecting said nozzle to a point of low pressure created by said suction-creating means, and manually operable valve means to control selectively the flow of air through said air-conducting means and said inlet port.

4. A vacuum cleaner comprising: a hollow base member; a dust pan within said base member; a housing mounted on said base member; a whirl chamber in said housing opening to said dust pan; an inlet port for introducing air into said whirl chamber at its periphery; a motor-operated blower device supported from said housing; an intake sleeve from said blower device extending axially downward into said whirl chamber to evacuate air from the lower mid-portion thereof; a cylindrical fabric partition wall in said housing between said whirl chamber and the wall of said housing dividing the latter into an annular filter chamber and an annular discharge chamber, said blower device discharging into said filter chamber; a movable suction nozzle within said filter chamber for cleaning the inner surface of said fabric partition wall; air-conducting means for connecting said suction nozzle with said whirl chamber, valve means to control selectively the flow of air through said air-conducting means and through said inlet port, and means controlled by the movement of said nozzle to actuate said valve means.

5. A vacuum cleaner comprising: a hollow base member; a dust pan within said base member; a housing mounted on said base member; a whirl chamber in said housing opening to said dust pan; an inlet port for introducing air into said whirl chamber at its periphery; a motor-operated blower device supported from said housing; an intake sleeve from said blower device extending axially downward into said whirl chamber to evacuate air from the lower mid-portion thereof; a cylindrical fabric partition wall in said housing between said whirl chamber and the wall of said housing dividing the latter into an annular filter chamber and an annular discharge chamber, said blower device discharging into said filter chamber; a movable suction nozzle within said filter chamber for cleaning the inner surface of said fabric partition wall; air-conducting means for connecting said suction nozzle with said whirl chamber, valve means to conrtol selectively the flow of air through said air-conducting means and through said inlet port, electrical actuating means connected to said valve means to position same, and switch means controlled by the movement of said nozzle to control the flow of electric current to said electrical actuating means.

6. In a vacuum cleaner of the type having a preliminary dirt separator of the centrifugal type to remove substantially all foreign material from air passing therethrough, an inlet port for dirt-laden air to said preliminary separator, suction-creating means connected at their suction side to said preliminary separator to draw air therethrough, and a final dirt separator including an air-permeable filter connected to said suction-creating means to receive air exhausted therefrom, a dirt-collecting nozzle for said final separator, permanently connected air-conducting means connecting said nozzle to said preliminary separator, means to effect relative movement between said nozzle and said final separator to enable the former to clean the surface of said filter, and valve means to control selectively and alternatively the flow of air through said nozzle and through said inlet port.

7. A vacuum cleaner having a preliminary dirt separator of the centrifugal type to remove substantially all foreign material from air passing therethrough, an inlet port for dirt-laden air to said preliminary separator, suction-creating means connected at their suction side to said preliminary separator to draw air therethrough, a final dirt separator including an air-permeable filter connected to said suction-creating means to receive air exhausted therefrom, a dirt-collecting nozzle for said final separator, air-conducting means connecting said nozzle to said preliminary separator, valve means normally biased to open said inlet port to control selectively the flow of air through said air-conducting means and through said inlet port, and manually operable means to actuate said nozzle and as an incident to such actuation open said air-conducting means to enable air to flow through said nozzle.

8. In a vacuum cleaner, suction-creating means, a plurality of dirt separators connected to said suction-creating means and through which pass air moved by said means, dirt-collecting means to collect dirt from one of said separators, air-conducting means to conduct dirt-laden air from said dirt-collecting means to another dirt separator, said last-mentioned dirt separator having an inlet port for dirt-laden air from an outside source, means to actuate said dirt-collecting means, and a single movable valve element to control the flow of air through said air-conducting means and through said inlet port.

9. In a vacuum cleaner, a dirt separator having an inlet for a dirt-laden air stream, suction-creating means to move air through said separator, means including an air-permeable dirt-collecting filter in the path of the flow of air through said separator and said suction-creating means, manually operable means to remove dirt from said filter to increase the flow of air through said separator, an air conduit connecting said means to said separator to conduct removed dirt thereto, and valve means controlled by said manually operable means to open said air conduit to a flow of air.

10. In a suction cleaner of the type having an initial dirt separator having an inlet port, suction-creating means to draw dirt-laden air through said inlet port into said initial dirt separator, and a final dirt separator connected to the exhaust of said suction-creating means to remove from the air all foreign material escaping from said initial dirt separator, said final dirt separator including an air-permeable element; a dirt-removing element mounted for movement relative to said final dirt separator to remove collected foreign material from said air-permeable element, normally closed permanently connected air-conducting means connecting said dirt-removing element to said initial dirt separator, and means responsive to the actuation of said dirt-removing element to open said air-conducting means between said element and said initial dirt separator.

DALE C. GERBER.
RALPH C. OSBORN.